United States Patent [19]
Bruno et al.

[11] Patent Number: 6,049,548
[45] Date of Patent: Apr. 11, 2000

[54] MULTI-ACCESS CS-P/CD-E SYSTEM AND PROTOCOLS ON SATELLITE CHANNELS APPLICABLE TO A GROUP OF MOBILE USERS IN CLOSE PROXIMITY

[75] Inventors: Ronald Bruno, Arlington, Va.; Leonard Schuchman, Potmac, Md.

[73] Assignee: Stanford Telecommunications, Inc., Reston, Va.

[21] Appl. No.: 08/846,491

[22] Filed: Apr. 28, 1997

Related U.S. Application Data

[63] Continuation-in-part of application No. 08/754,428, Nov. 22, 1996, abandoned.

[51] Int. Cl.$^7$ .................................................. H04L 12/413
[52] U.S. Cl. .................................................. 370/445
[58] Field of Search ........................... 370/445, 319, 370/338, 344, 276, 279, 281; 455/518, 519, 520, 12.1, 13.1, 528, 458; 342/352, 353, 456, 30, 33, 38, 39, 42, 43, 44, 45, 46

[56] References Cited

U.S. PATENT DOCUMENTS

| | | | |
|---|---|---|---|
| 4,082,919 | 4/1978 | Day et al. .............................. | 455/563 |
| 4,987,571 | 1/1991 | Haymond et al. ...................... | 370/445 |
| 5,212,685 | 5/1993 | Stilwell, Jr. et al. .................... | 370/296 |
| 5,404,375 | 4/1995 | Kroeger et al. ........................ | 455/12.1 |
| 5,440,544 | 8/1995 | Zinser et al. ............................ | 370/319 |
| 5,459,469 | 10/1995 | Schuchman et al. ..................... | 342/37 |
| 5,506,837 | 4/1996 | Sollner et al. .......................... | 370/296 |
| 5,515,035 | 5/1996 | Gut ......................................... | 370/445 |
| 5,533,015 | 7/1996 | Makowski et al. ..................... | 370/296 |
| 5,617,412 | 4/1997 | Delprat et al. .......................... | 370/281 |
| 5,627,546 | 5/1997 | Crow ....................................... | 342/352 |
| 5,717,830 | 2/1998 | Sigler et al. ............................. | 455/426 |
| 5,734,643 | 3/1998 | Rondeau ................................. | 370/279 |

*Primary Examiner*—Douglas W. Olms
*Assistant Examiner*—Ken Vanderpuye
*Attorney, Agent, or Firm*—Jim Zegeer

[57] ABSTRACT

A multiple access RF communication system in which a plurality of mobile user transceivers communicate with a central hub transceiver through an earth orbiting satellite, and wherein groups of mobile user transceivers in close proximity with each other share a common multi-access inbound (to hub) frequency $F_I$ and a common outbound channel (from hub) frequency $F_o$. Each said mobile user transceiver includes a continuously listening receiver for the outbound channel and a half-duplex transceiver on the inbound channel, determining the busy or idle status of the common inbound frequency $F_1$, and a device to indicate the status of the carrier outbound channel, which controls the ability to transmit on the inbound channel.

9 Claims, 6 Drawing Sheets

Key:
OC=Outbound Channel (from Hub)
IC=Inbound Channel (to Hub)

Key:
OC=Outbound Channel (from Hub)
IC=Inbound Channel (to Hub)

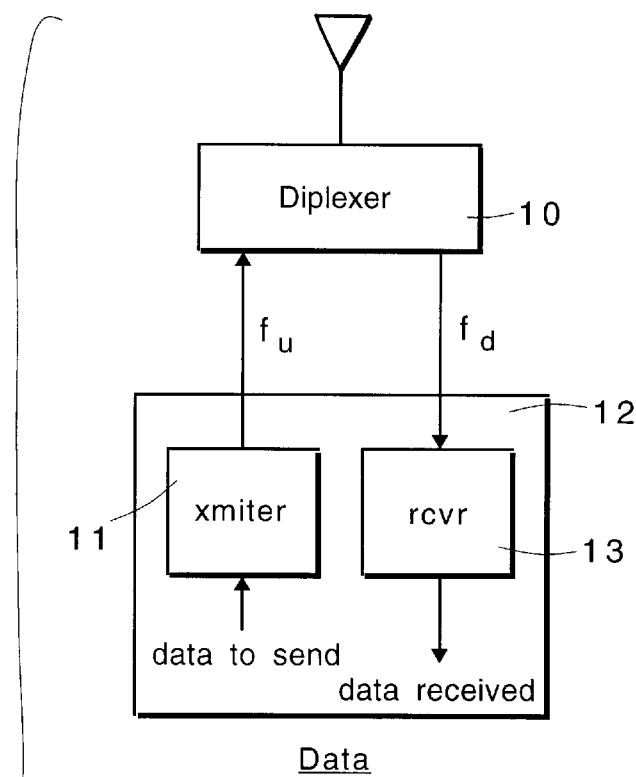
Data
Figure 4a
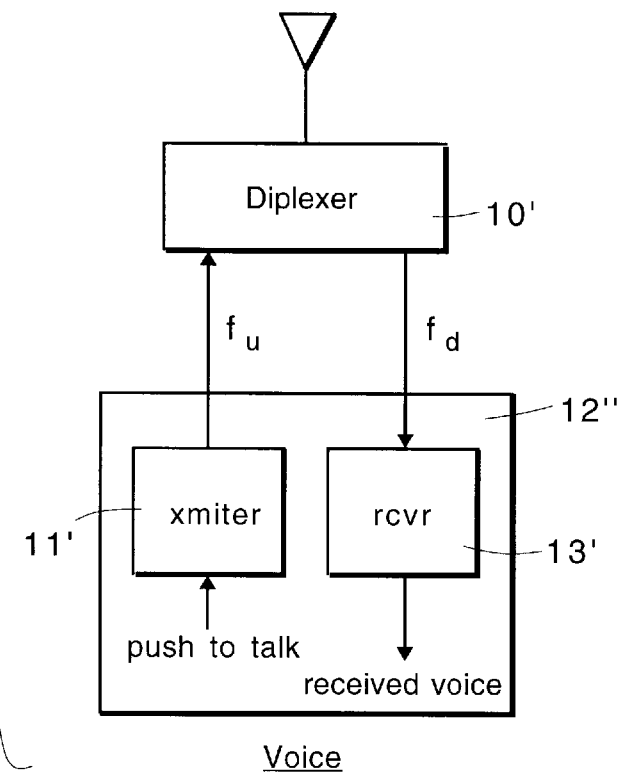
Voice ically unwieldy and inefficient protocol because the
MULTI-ACCESS CS-P/CD-E SYSTEM AND PROTOCOLS ON SATELLITE CHANNELS APPLICABLE TO A GROUP OF MOBILE USERS IN CLOSE PROXIMITY This application is a continuation-in-part application of Ser. No. 08/754,428 filed Nov. 22, 1996 now abandoned entitled NOVEL MULTI-ACCESS CS-P/CD-E SYSTEM AND PROTOCOLS ON SATELLITE CHANNELS APPLICABLE TO A GROUP OF MOBILE USERS IN CLOSE PROXIMITY.

BACKGROUND AND BRIEF DESCRIPTION OF THE INVENTION

Multiple-access channel protocols are applicable to data and voice channels.

Satellite Data Channels:

Typical multi-access protocols for a satellite data channels are derived from the basic ALOHA or slotted ALOHA (S-ALOHA), in which a mobile user (MU) spontaneously sends data (asynchronous or in time slots) on the multi-access channel and then listens to the echo of the transmission from the satellite to decide whether a collision occurred. In a half-duplex system, the MU hears the actual relay echo of its signal from the satellite, while in a full duplex frequency system, the MU hears the result of its transmission into uplink multi-access channel as a uplink channel status "echo message" written to data of the downlink channel. Depending upon the length of data transmissions by the MUs, the protocol might also require an MU to determine the current state of the uplink channel (busy or idle) and delay transmission until the channel is idle. Over satellite channels, data transmission protocols derived from ALOHA are inherently inefficient because of the long round trip times associated with satellite channels (roughly 0.25 seconds for GEO satellites).

Satellite Voice Channels:

The typical multi-access (i.e., party line) protocol for a voice channel is a "push-to-talk" protocol. In this protocol, an MU listens to the multi-access channel on an ongoing basis. When the MU has a need to talk, it waits until the channel is idle (no talking), pushes a button on the transceiver (which seizes the channel), and proceeds to talk. If two MUs "push-to-talk" within the round trip delay time of the channel, a voice collision occurs, and both MUs must start over. Over a satellite channel, "push-to-talk" is an inherently unwieldy and inefficient protocol because the long round-trip delay time leads to may voice collisions.

THE PRESENT INVENTION

The present invention solves the above problems by providing an outbound proximity receiver at each mobile user station which is continuously (persistently) in the listening mode to determine the status (busy/idle) of a multi-access channel. In the exemplary embodiment, a single spatial beam from a satellite is divided into a plurality of proximity regions, each of which is served by a dedicated channel and each mobile user use channel sense via proximity to determine the status (busy/idle) of a multi-access satellite channel. Optionally, an indicator light or other audio visual device can be used to inform the talker on a voice party line that the channel is busy. The invention has particular utility in the field of communications between airplanes and one or more traffic controllers.

The objective of the invention is to provide an improved multi-access communication system for satellites or long delay communication channels.

A further objective of the invention is to provide a multi-access satellite communication system having a novel multi-access protocol.

DESCRIPTION OF THE DRAWINGS

The above and other objectives, features and advantages of the invention will become more apparent when considered with the following specification and accompanying drawings wherein.

DETAILED DESCRIPTION OF THE INVENTION

Figure 1:
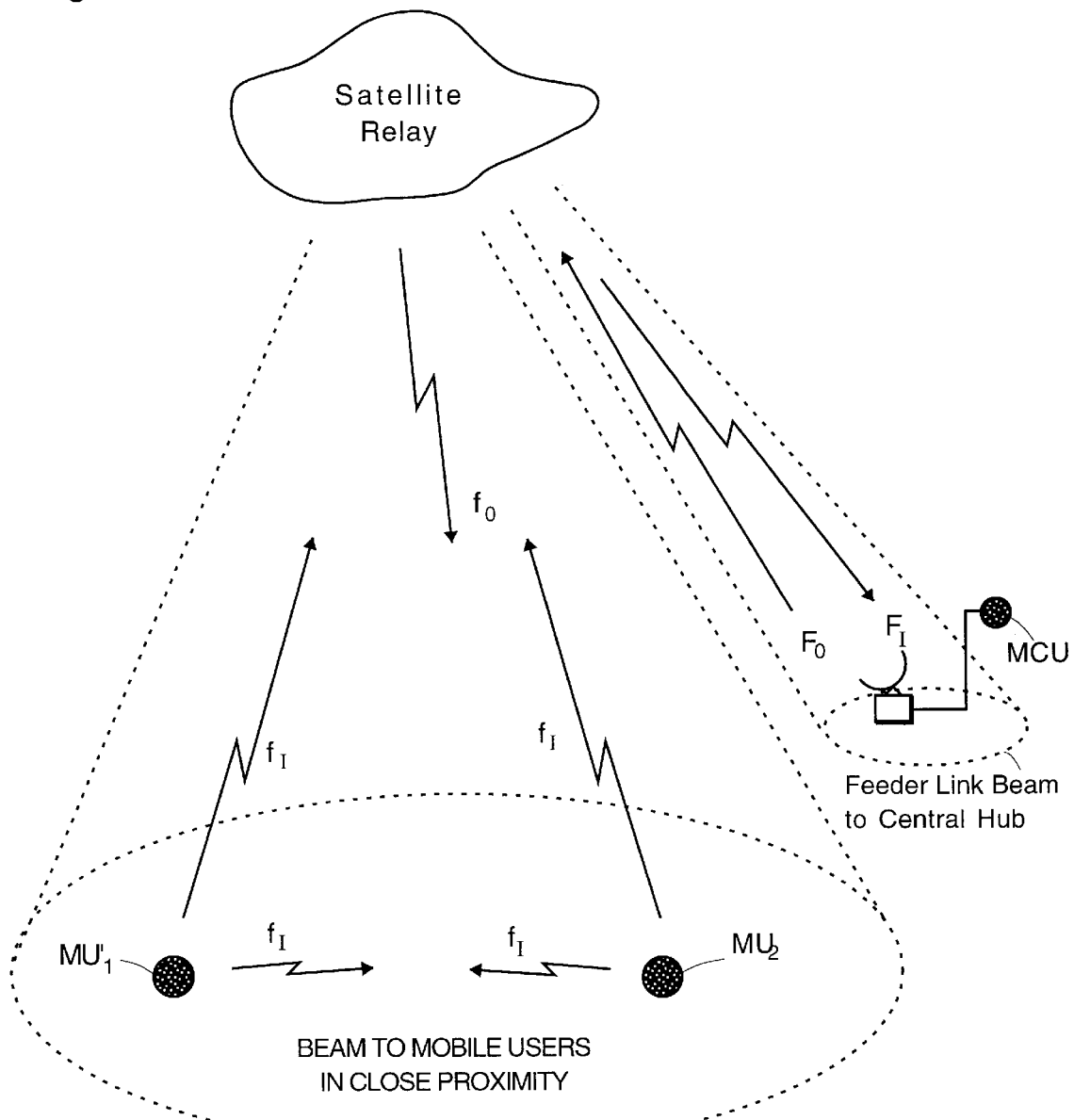
FIG. 1 is a block diagram of a multiple access satellite communication system incorporating the invention.

The invention applies to satellite and other long-delay channels in which the MUs are in close proximity such that each can detect whether any other MU is transmitting. FIG. 1 illustrates such general system in which a number of MUs are connected in a full-duplex configuration with a master controller user MCU that is connected to the system via a ground station in a satellite feeder link beam. An embodiment of this would be an air traffic control system in which the traffic controller assumes the position of the master controller user (MCU), and the airplanes in a region assume the position of the MUs. In this system, the MCU controls the outbound channel which is carried by $F_0$ on the uplink and $f_o$ on the downlink. The inbound channel carried by $f_1$ on the uplink and $F_I$ on the downlink is a multi-access channel that any of the MUs may transmit onto (one at a time). In the typical ALOHA-derived data protocol of "push-to-talk" voice protocol, an MU determines the state (busy or idle) of the inbound channel by the broadcast on the outbound channel. Because of the satellite channel delay, this knowledge is always stale, and this leads to the inefficiency of both data voice protocols. With the unique protocol described herein, each MU has a receiver for the inbound channel as well. Then, because the MUs are in close proximity (e.g., about 300 km) as illustrated in FIG. 1, each MU can receive the transmissions from all MUs in the proximity. Thus, each MU knows whether the inbound channel is busy or idle with a staleness of at most 1 msec.

This assumes that, while the MU antenna may be somewhat directed toward the satellite, there will be sufficient gain in the direction of proximity MUs for those MUs to detect the transmission. This ability to rapidly sense the channel enables the implementation of much more efficient protocols for both data and voice in this situation. The protocols disclosed herein are referred to as CS-P/CD-E because the channel sense (CS) to determine the state of the multiple access channel is facilitated via MU proximity (P), but collision detection (CD) is implemented via the satellite echo (E). These protocols are distinguished from the conventional existing protocols via satellite that use the satellite echo (E) for both channel sense CS and collision detection CD.

Figure 2A:
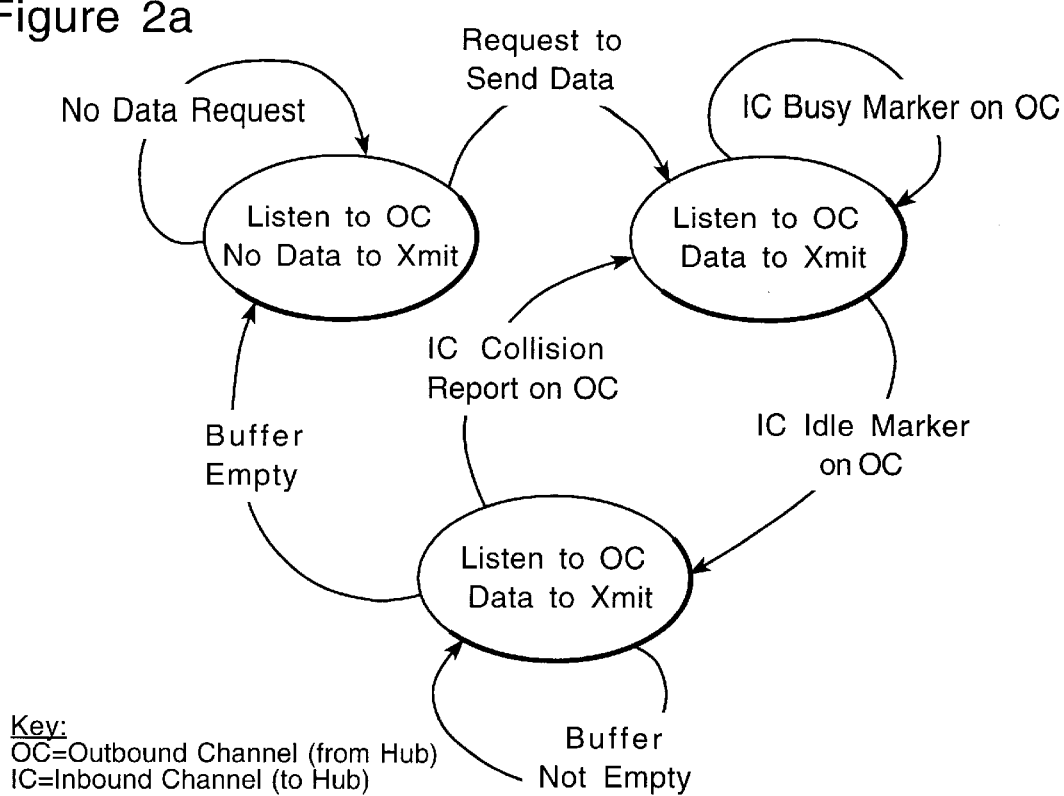
FIG. 2a is a state diagram for mobile users (MU) transceiver with ALOHA-type protocol for data without current knowledge of inbound channel state.
Figure 2B:
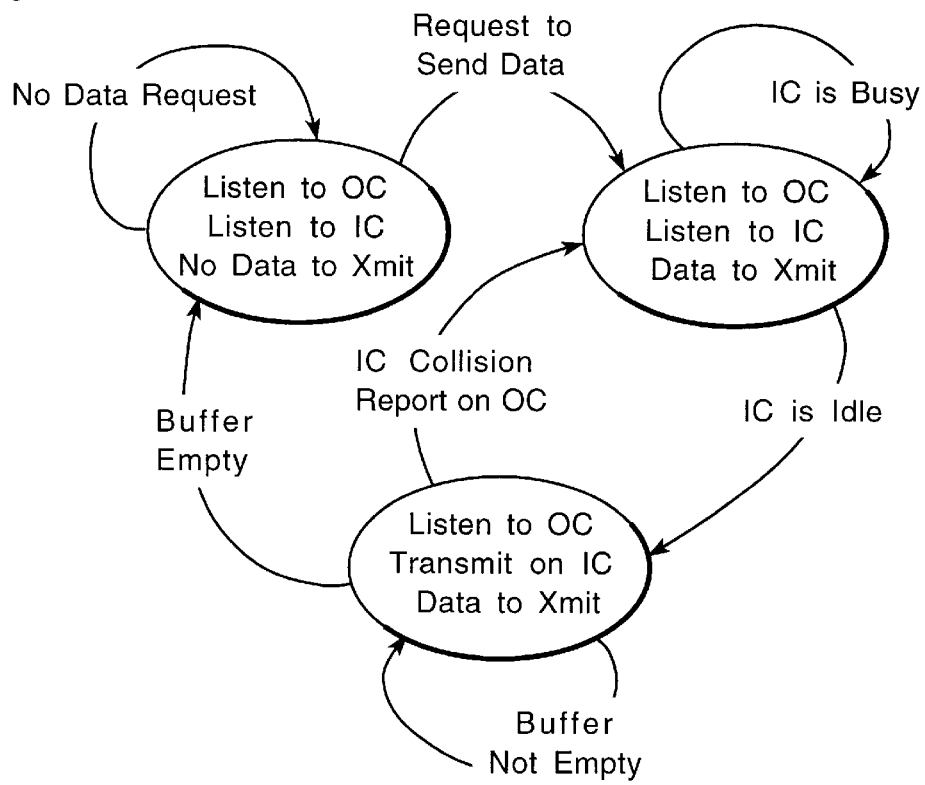
FIG. 2b is a state diagram of a MU transceiver with ALOHA-type protocol for data using current knowledge of inbound channel state via "listening-in" on proximity mobile units (MUs)

FIGS. 2a and 2b illustrate the state diagram for the MU transceiver with multi-access data transfer protocols of the ALOHA type and the CS-P/CD-E type covered by the invention, respectively. The 37% maximum channel loading for an S-ALOHA protocol is well known and the practical maximum loading is much less. By contrast, a CS-P/CD-E protocol may achieve upwards of 90% channel loading depending upon the nature of the data traffic and the detailed design of the CS-P/CD-E to the specific nature of the data traffic.

Figure 3A:
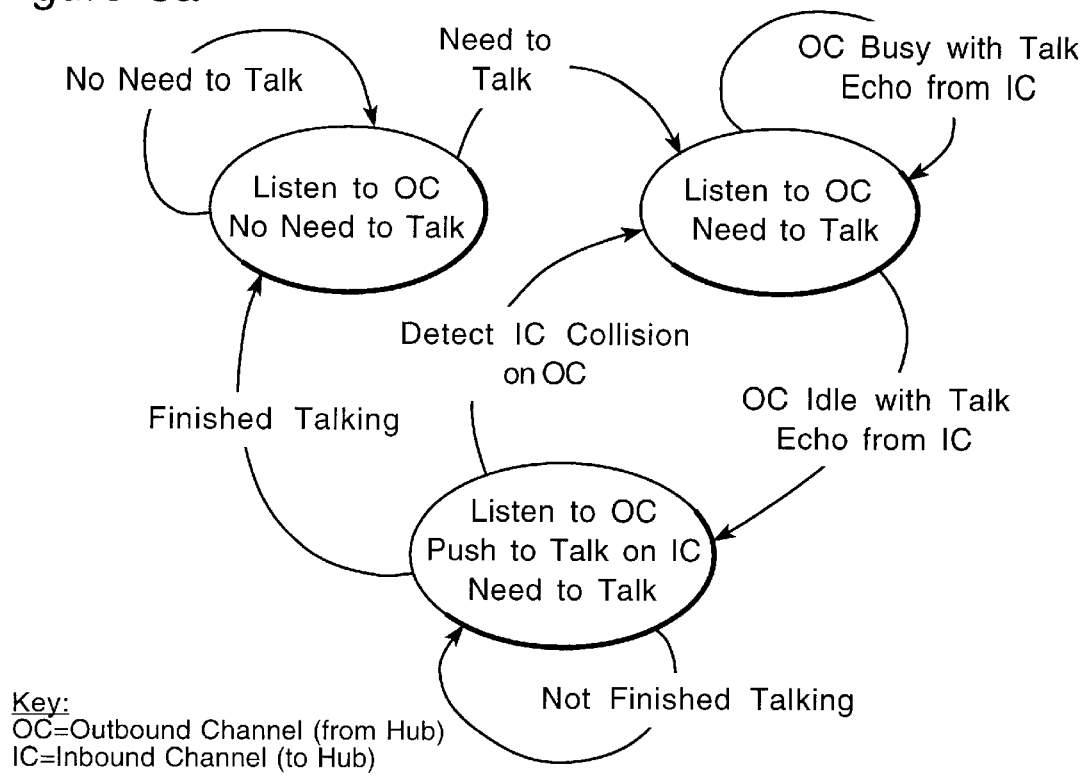
FIG. 3a is a state diagram of a MU transceiver with ALOHA-type protocol for voice without current knowledge of inbound channel state.
Figure 3B:
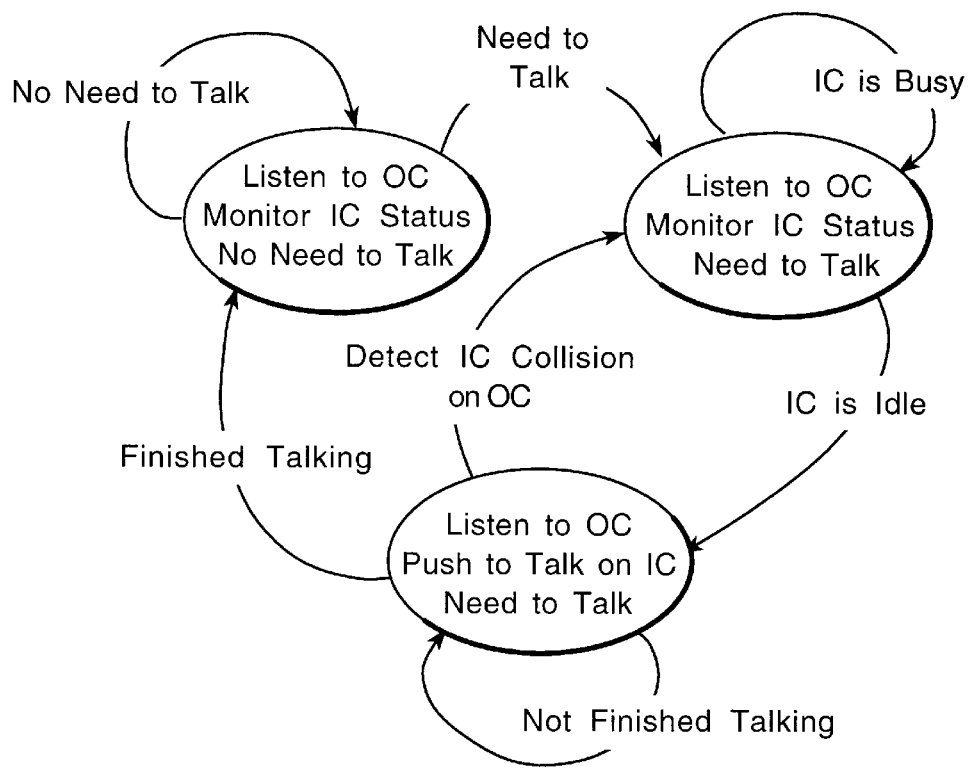
FIG. 3b is a state diagram with ALOHA-type protocol for voice using current knowledge of inbound channel state via "listening-in" on proximity mobile units and incorporating the invention, FIG. 4a (prior art) illustrates a block diagram for typical user mobile equipment (voice and data modes) for a conventional multi-access satellite channel.

FIGS. 3a and 3b illustrate the state diagram for the MU transceiver with multi-access (party line) voice protocols of the simple "push-to-talk" type and the CS-P/CD-E type covered by the invention. Note that in the "push-to-talk" protocol, there are hundreds of milliseconds of time during which MUs can "simultaneously" begin transmission and therefore lead to a collision. This contrasts with a CS-P/CD-E voice protocol in which an MU would not transmit unless the CS-P (channel sense via proximity) indicates that the channel is idle. Because of MU proximity, the time during which a collision can occur is about 1 msec. Thus, the probability of a voice collision occurring when an MU enters the party line is reduced by over 2 orders of magnitude. Note that the MU would be informed of the inbound channel status via an indicator light or other audio-visual tied to the MU transceiver.

Figure 4C:
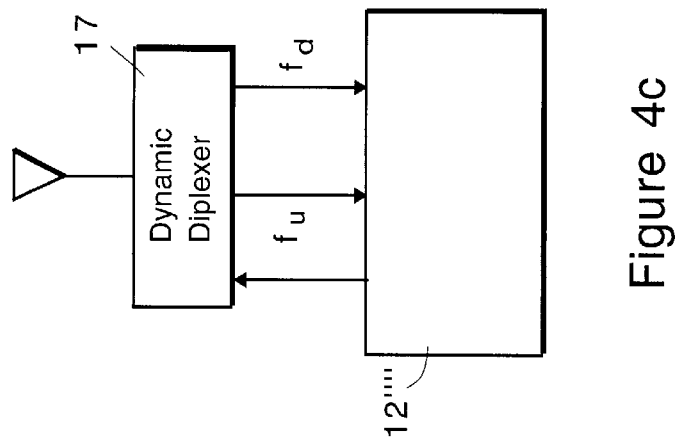
FIG. 4c illustrates a single antenna embodiment for the data or voice modules of FIG. 4b.
Figure 4B:
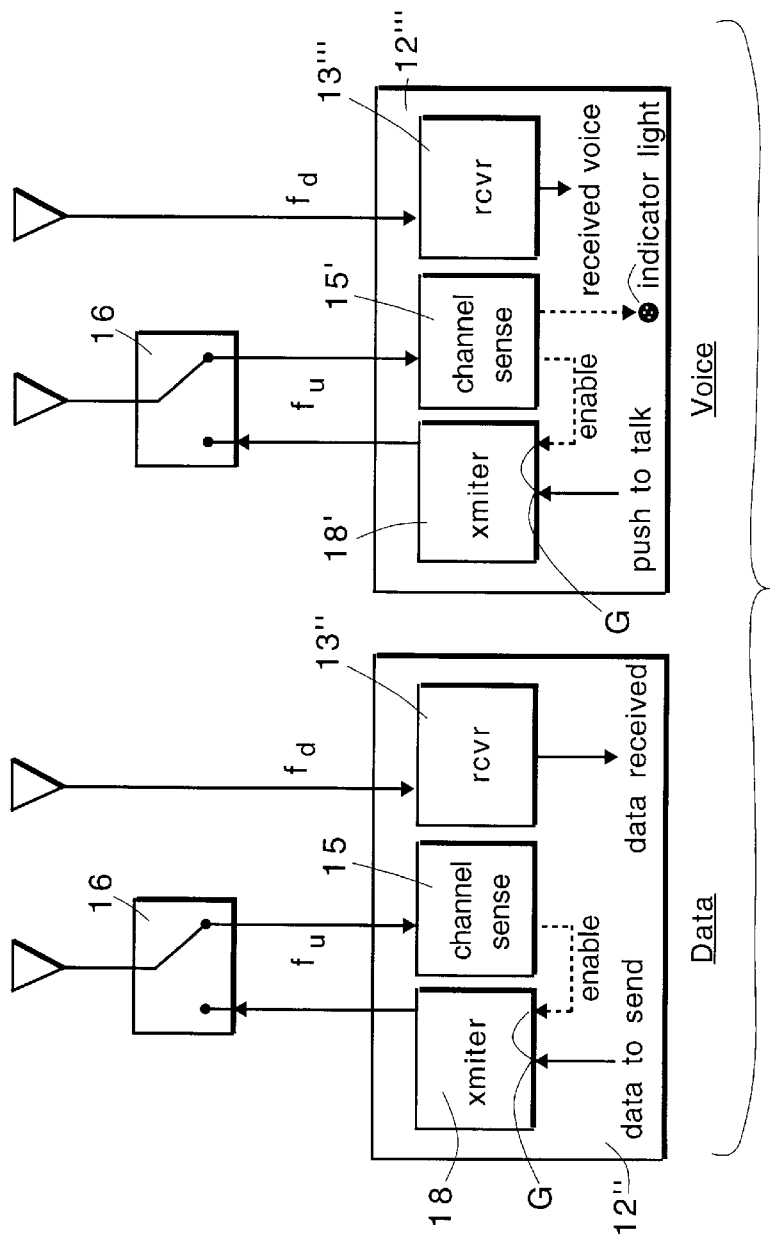
FIG. 4b illustrates user mobile equipment for multi-access satellite incorporating the present invention.

FIGS. 4a and 4b illustrate the configuration of the MU equipment with respect to outbound and inbound channels for conventional and CS-P/CD-E protocols according to this invention, respectively.

In the data mode, the diplexer 10 couples the antenna to the transmitter 11 of transceiver 12 which modulates data on uplink carrier $f_u$ and received data on downlink carrier $f_d$ to receiver 13 which downconverts and demodulates and outputs data received to a utilization device. In the voice mode, voice signals are modulated on a carrier when a push-to-talk switch (not shown) is operated and transmitter 11' outputs a modulated carrier $F_1$ to diplexer 10'. Received voice modulated carrier $f_u$ is routed to receiver 13' by diplexer 10' which outputs received voice signals to a speaker. The channel sense receiver 15 is illustrated in FIG. 4a. In the data mode, a switch 16 (which may be included in dynamic diplexer 17 shown in FIG. 4c) couples the uplink signals from other user transceivers in proximity thereto to channel sense receiver 15 which is consistently listening, and in the absence of activity, generates an enable signal for data transmitter 18. Switches 16 and 16' are operated to the transmit position only when there is data or voice to transmit in the presence of an enable signal from AND gate G. The down link carrier $F_d$ is coupled to receiver 13" and demodulated and the data supplied to a utilization device. In like manner, in the voice mode, switch 16 coupler proximity uplink carrier signals $f_u$ to channel sense receiver 15 which detects channel activity or idle status. If idle, an enable signal is sent to the voice transmitter 18', and at the same time an indicator 21 which may be a light or other audio visual signal is activated. In FIGS. 4a and 4b, a separate antenna is shown for carrier $f_u$ and $f_d$, respectively. In FIG. 4c a diplexer 17 is used with a common or single antenna.

Figure 5:
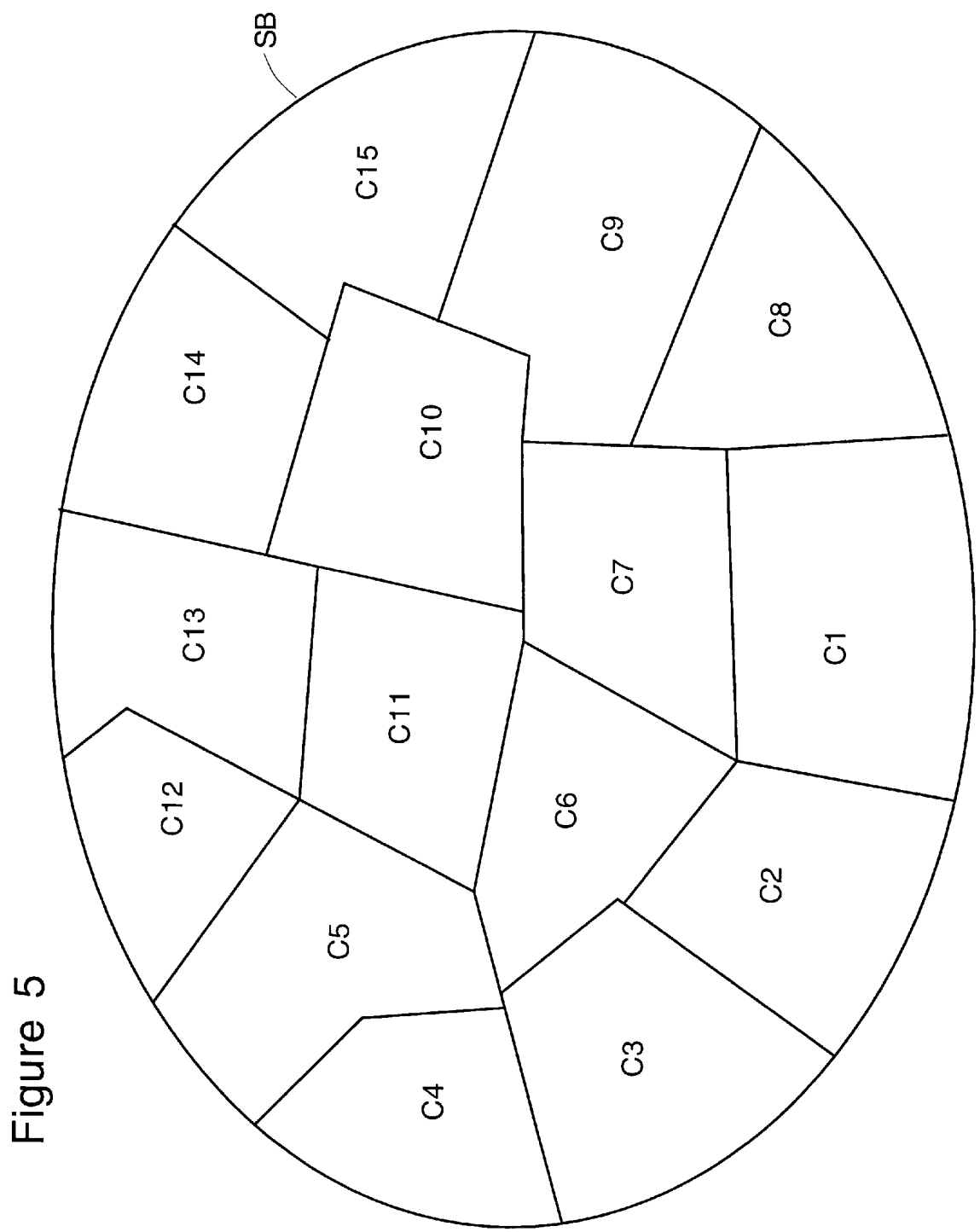
FIG. 5 is a diagrammatic illustration of the division of a single spatial beam of a satellite into many proximity regions, each of which is served by a dedicated channel.

FIG. 5 illustrates how a large region covered by a single satellite beam SB supporting many channels could be broken in a number of proximity regions C1–C15 that are each served by a dedicated channel. Note that this concept is applicable whether channels are designated by frequency division, time division, code division or any combination thereof. Also note that the boundaries of the proximity regions will overlap in order to support the handover of an MU from one proximity region to another.

An alternative configuration for air traffic control will have a single outbound channel per beam which has a digital TDM stream of controller voice channels, data channels, surveillance report back requests and retransmission of surveillance report backs for air based collision avoidance. The inbound channel designs for voice, data and surveillance remains the same as described above.

This same transceiver can be used for surface terminal voice, data and airport surface surveillance. In this mode, the transceiver will respond to an airport distributed cell-like terrestrial communication system using power control. The frequencies allocated to this surface communication system will be those utilized by the satellite based system in other beams.

UNIQUE FEATURES OF THE INVENTION (a) The use of channel sense via proximity to determine the status (busy/idle) of a multi-access satellite channel.

(b) The use of channel sense via proximity to determine the status (busy/idle) of a multi-access channel in concert with the use of collision detection via direct echo relay or echo message.

(c) Thus use of any aspect of CS-P/CD-E in the design or implementation of protocols for the transmission of data or voice over a multi-access satellite channel.

(d) The definition of multiple proximity regions that comprise a single large satellite beam and assignment of dedicated unique channels to each proximity region.

(e) The use of an indicator light or other audio-visual to tell a talker on a CS-P/CD-E voice party line that the channel is busy.

(f) The application of (a), (b), (c), (d) or (e) in any combination to communications between airplanes and a traffic controller.

(g) The use of a mobile terminal for satellite communications with the novel MA technique that combines a simplex receiver at the outbound channel (downlink from hub) for receiving messages from a central controller and a half-duplex transceiver at the inbound multi-access channel (uplink to hub) for transmission of messages to the hub, listening to the channel to ensure that the channel is not busy before transmitting, and listening to the channel to extract data from proximity mobiles that may be transmitting a message to the central controller.

(h) The use of the novel MA technique with a data channel used for dependent surveillance for aircraft, whereby an aircraft announces its presence to an air traffic controller when it enters a proximity region and then is regularly polled by the traffic controller, and sends its position, speed, heading and other data in response to the poll by the traffic controller.

(i) The use by the aircraft of an inbound data channel of the novel MA technique for air-to-air collision avoidance in which an aircraft detects the presence of another aircraft in the proximity region by listening in on the MA inbound channel, learning the position and vector of that proximity craft by demodulating and interpreting the navigation data that is sent by that aircraft, and finally by taking measures to avoid that aircraft if they are on a collision course.

(j) An alternative air based collision avoidance system uses the alternative TDM downlink for retransmission of the inbound report back surveillance position updates from all aircraft in the beam and all aircraft in adjacent beams near the boundary.

While the invention has been illustrated and described in connection with a preferred embodiment, it will be appreciated that other embodiments, adaptations and modifications of the invention will be readily apparent to those skilled in the art.

What is claimed is:

1. In a multiple access RF communication system in which a plurality of mobile user transceivers communicate with a central hub transceiver over long delay channels, and wherein groups of mobile user transceivers in close proximity with each other share a common multi-access inbound channel frequency $F_1$ and a common outbound channel, frequency $F_o$, the improvement comprising:

each said mobile user transceiver including a continuously listening proximity receiver for the inbound channel and a half-duplex transceiver on the inbound channel means for determining the busy or idle status of said common inbound frequency $F_I$, and means to indicate the status of said carrier outbound channel and control the ability to transmit on the inbound channel.

2. The multiple access RF communication system defined in claim 1 wherein said central hub transceiver communicates through an earth orbiting satellite and said earth orbiting satellite transmits to earth a spatial beam which is divided into a plurality of proximity regions on earth, and each mobile user is adapted to use channel sense via proximity to determine the status of a said multi-access inbound channel.

3. The multiple access RF communication system defined in claim 1 wherein said mobile user transceiver includes a visual indicator of the status of said multi-access inbound channel.

4. The multi access RF communication system defined in claim 1 wherein a controlled aircraft includes a mobile user transceiver and said central hub transceiver communicates flight control information to said controlled aircraft via said mobile user transceiver.

5. The multi access RF communications system defined in claim 4 wherein each said transceiver is adapted to respond to an airport distributed cell-like communication signal using power control and said transceiver can be used for terminal voice, data and airport surveillance.

6. In a multiple access RF communication system in which a plurality of mobile user transceivers communicate with a central hub transceiver through an earth orbiting satellite, and wherein groups of mobile user transceivers in close proximity with each other share a common multi-access inbound frequency $F_1$ and a common outbound channel frequency $F_o$, the improvement comprising a simplex receiver at the outbound channel for receiving messages from a central controller and a half-duplex transceiver at the inbound multi-access channel for transmission of messages to the hub, listening to the channel to ensure that the channel is not busy before transmitting, and listening to the channel to extract data from proximity mobiles that may be transmitting a message to the central controller.

7. In a multiple access RF communication system in which a plurality of mobile aircraft user transceivers communicate with a central hub transceiver through an earth orbiting satellite, and wherein groups of mobile aircraft user transceivers in close proximity with each other share a common multi-access inbound frequency $F_1$ and a common outbound channel frequency $F_o$, the improvement comprising means forming voice and data communication channels, said data channels used for dependent surveillance for aircraft, whereby a mobile aircraft user transceiver announces its presence to an air traffic controller when it enters a proximity region and then is regularly polled by the traffic controller, and sends its position, speed, heading and other data in response to the poll by the traffic controller.

8. In a multiple access RF communication system in which a plurality of mobile aircraft user transceivers communicate with a central hub transceiver through an earth orbiting satellite, and wherein groups of mobile aircraft user transceivers in close proximity with each other share a common multi-access (MA) inbound frequency $F_1$ and a common outbound channel frequency $F_o$, the improvement comprising a method of aircraft collision avoidance wherein use by the mobile aircraft user transceiver of said inbound data channel for air-to-air collision avoidance wherein a mobile aircraft user transceiver detects the presence of another aircraft user transceiver in the proximity region by listening in on the MA inbound channel, learning the position and vector of that proximity aircraft by demodulating and interpreting the navigation data that is sent by that mobile aircraft user transceiver, and finally by taking measures to avoid that aircraft if they are on a collision course.

9. A system for avoiding aircraft collisions in which each aircraft has an RF transceiver; a multi-beam RF communication system comprising an orbiting satellite relay which transmits to earth on one or more satellite beams, each satellite beam transmits voice, data, surveillance report back requirements and the retransmission of inbound surveillance reports from aircraft transceivers in the beam and aircraft transceivers near the beam's boundary so that each aircraft transceiver can demodulate and interpret the positional data transmitted via the satellite relay and determine if any aircraft is a collision threat and if so take measures to avoid the aircraft presenting a collision threat.

* * * * *